May 18, 1937. L. DEWAN ET AL 2,080,766
SKATE
Filed Oct. 2, 1935 2 Sheets-Sheet 1

INVENTOR
Leon Dewan
John Barth

May 18, 1937.  L. DEWAN ET AL  2,080,766
SKATE
Filed Oct. 2, 1935   2 Sheets-Sheet 2
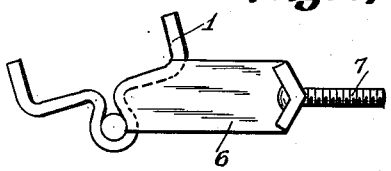
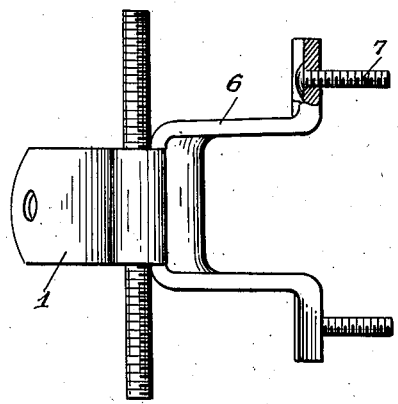
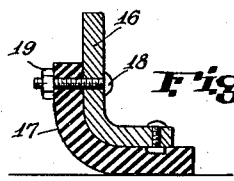
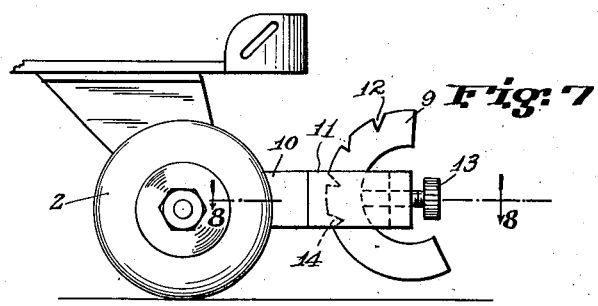
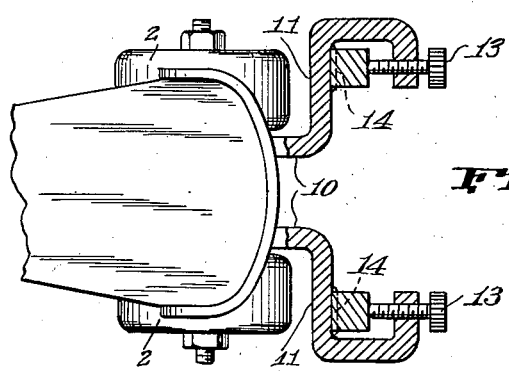
INVENTOR Patented May 18, 1937

2,080,766

UNITED STATES PATENT OFFICE 2,080,766

SKATE

Leon Dewan and John Bartho, New York, N. Y., assignors of fifteen per cent to J. R. Wren, New York, N. Y., and ten per cent to J. H. Wren, Brooklyn, N. Y.

Application October 2, 1935, Serial No. 43,190

11 Claims. (Cl. 208—173)

This invention relates to skates in general and has for its object means whereby a skater may stop quickly and safely.

According to this invention, one or more friction members are attached to the rear portion of the skate and may be caused to engage whatever surface the skater is traversing to cause sufficient friction to stop the skater within the required distance.

Figure 4 is a side view of the lower part of the rear truck of the skate apart from the skate and constructed according to the invention.

Figure 5 is a view from below of the lower part of the skate truck according to the invention.

Figure 6 illustrates in cross section a modified form of the brake member which engages the ground.

Figure 7 illustrates a modification of the invention wherein certain parts of the securing means for the brake frictional member are shown in side elevation.

Figure 8 is a view from above of the invention as illustrated in Figure 7, wherein the brake members and the means for securing same are shown in cross section taken on the line 8—8 of Figure 7.

Figure 1:
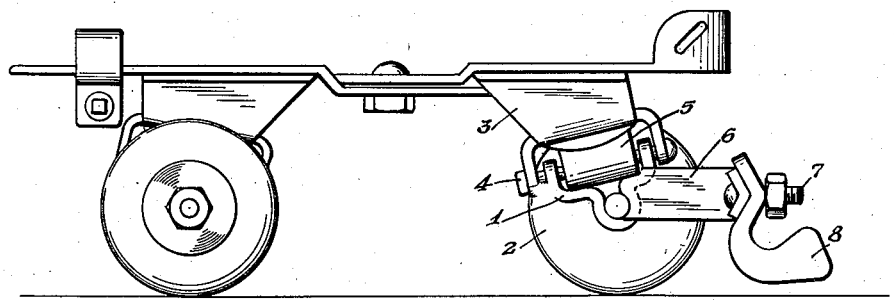
Figure 1 shows a skate according to this invention in side elevation with one of the rear wheels removed to expose the brake of the invention and the rear truck of the skate.
Figure 2:
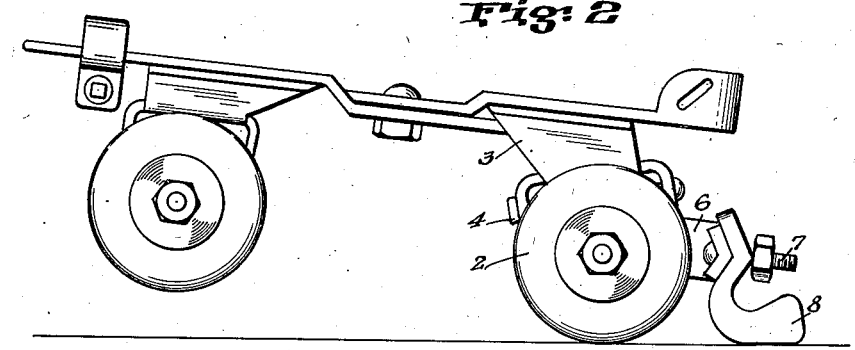
Figure 2 represents the position of the skate when tilted to apply the brakes to the ground.
Figure 3:
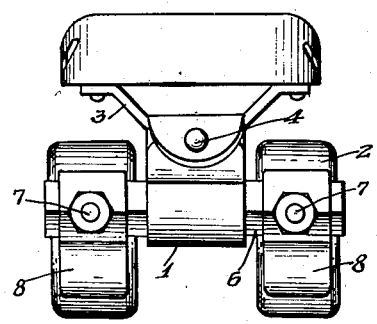
Figure 3 is an end view of the invention.

In Figures 1 and 2 and 3 showing one embodiment of this invention, the skate is a type now in common use, wherein the axle housing or lower truck 1 of the rear wheels 2 is flexibly coupled to the upper portion of the rear truck of the skate by means of a pivot joint consisting of a pin 4 and a rubber block 5. This axle housing is made of thicker metal than usual and is so shaped in the stamping-out process that the two projections 6 are formed, which bend around the rear wheels while two screws 7 are riveted or welded to the ends thereof. These terminals of the projection form a means for mounting the detachable friction members 8 which shall hereafter be designated as brake-shoes.

By means of the above described arrangement a skater may stop by tilting the skate backwards so that the flat bottom of the brake-shoes engage the skating surface causing friction therewith. Figure 3 indicates the position of the skate rear wheels and the brakes during the stopping period. The angle made by the brake-shoe bottom with the ground when the skate rests with four wheels on the ground, is such that the whole brake bottom will engage the ground when the skate is tilted.

The upper face of the brake-shoe bottom is at an angle A with the lower face for the reason that where the two faces are parallel the lower face would commence to form a rearwardly converging angle with the upper face as the brake shoe wears down till a dangerous knife edge forms at the end of the brake-shoes. Whereas with this arrangement the ends remain blunt till the whole bottom of the brake-shoe is severed or suddenly shortened by wear.

It has been found in practice that an individual using these skates may stop not only by putting one foot forward and tilting the skate to cause frictional engagement with the ground, but may even remove the other foot from the ground and rest entirely upon the tilted skate thereby causing a greatly increased braking action since the whole weight of the body is applied to the braking skate. However, the body weight is still divided between the rear wheels and the brake-shoes.

In order to further increase the portion of the body weight applicable to the brakes, the brake-shoe bottom is placed as closely as possible to the vertical plane of the axle so that the leverage obtained is greater. In view of the fact that a lever is formed with the rear axle as a fulcrum, the front part of the foot as the point of power application, and the heel as the moved body, the ease of rising and tilting the skate is increased, and more of the weight of the body can be made to rest on the brake shoes than on the rear wheels and thereby increase the braking action. It will be seen that the vertical portions of the brake-shoes as well as of the projections 6 are so formed and positioned relative to the wheel rim that the space formed between them is smaller at the lower portion thereof than at the top, so that whenever a small object is picked up and carried around by the wheels, it is not wedged in this space, but rejected if too large and permitted to pass if small enough, to the wider upper portions of the skates.

The ends of the projections 6 are slightly V shaped vertically so that the brake-shoes shall not turn in the vertical plane but always keep their bottoms rigidly facing the ground.

The brake-shoes are placed behind the rear wheels for the following reason: Under most outdoor conditions a certain unevenness of the ground often caused the part between the wheels to be higher than where the rims are riding. It is evident that the brake bottoms must be placed quite low in order not to necessitate too great a tilting of the skate and thus in the above mentioned case the possibility often arises of the brake suddenly engaging such an obstacle at high speed with disastrous consequences. However, according to this invention the wheels, themselves, rise over any ground irregularities and carry the brakes behind them upwards. Furthermore when hitting a ridge, especially at high speed, the wheels jump or are carried upwards and do not again touch the ground for quite a distance thus clearing the brakes. Another effect is that the small stones etc., that might otherwise engage the brake-shoes are thrown to one side by the advancing wheels.

By attaching the projections 6 to the axle housing the effect produced when the skate is tilted to apply the brakes is that the rubber block 5 ordinarily placed between the upper part of the skate truck and the axle housing is caused to absorb the shocks when irregularities hit the applied brakes and the brakes ride fissures and ridges in the ground safely. Of course it is also possible to have the projections 6 attached to the upper portion of the skate.

Figures 4 and 5 showing side and bottom views respectively of the lower portion of the skate truck when it is removed from the skate, illustrate more clearly the form thereof and the fact that the truck according to the invention may be produced by stamping with practically no added cost over the usual skate truck, and with the same speed and convenience.

It has been found under ordinary conditions with the use of the brake-shoes as in Figures 1 and 2, that the wear upon the brake-shoes, even when made of hard steel, is remarkably rapid necessitating frequent replacement thereof.

In order to reduce the inconvenient frequency of replacement the arrangement of Figures 7 and 8 may be employed. Here the brake-shoe 9 is in the form of a bar of about the same width as the brake-shoe 8 and thick enough to provide sufficient braking surface. The bar is bent into an arc forming part of a circular ring, and works in the bent portion 11 of the projection 10. The projection 10 is attached to the lower part of the rear truck similarly to projection 6 of Figures 1 and 2 and may be produced by stamping the whole lower rear truck in one piece as has been mentioned. The notches 12 in the bar 9 serve to secure the bar even if the screw 13 is not very tight. This screw forces the bar 9 against the face of the projection 10, at the portion 11 so that the notches 12 engage the complementary ridges 14 in the projection 10, at 11 and support the bar against stress in the application of the brakes. The ridges 14 may be formed in the stamping process and need not be very pronounced.

It is only necessary when the end of the bar 9 has worn down to lower it by another notch or indentation, and since doing so merely turns the ring, of which the bar 9 forms a sector, around a fixed center, the angle and gradual slope presented to the ground is always constant.

Although the brake-shoes throughout have been shown to be of metal such as steel for example it has been found that rubber placed underneath the bottom of the brake-shoe in order to engage the ground, not only provides a greater friction but possesses extreme durability. Figure 6 shows a means whereby this feature may be applied. The brake-shoe 16 is made in this case shorter than usual and a strip of rubber 17 is of such thickness that its bottom holds the same relation to the ground as the brake-shoes 8 of Figures 1 and 2. The rubber shoe is attached to the metal by means of the screw 18 which are riveted to the metal support and engages the rubber shoe by means of washers which may be moulded in the rubber, and the nuts 19.

What we claim as new is:

1. In a roller skate, foot-supporting means, front wheels and rear wheels, and trucks for connecting the wheels to the foot-supporting means, the rear truck having a projection on each side thereof, frictional braking members, and means associated with the projections for attaching said friction braking members fixedly thereto, whereby tilting of the skate causes said friction braking members to engage the ground and stop the skate by the frictional engagement therewith.

2. A skate truck, projections extending therefrom, and frictional braking members secured to said projections at opposite sides of the longitudinal axis of the skate for independent or simultaneous engagement with a skating surface.

3. A two-wheeled skate truck for a toe or heel plate, projections extending from said truck, and means to secure individual braking members to said projections whereby tilting of the skate will cause one or all of the braking members to engage the skating surface.

4. A brake for a skate consisting of a substantially L-shaped member, the base of which is adapted to have frictional contact with a supporting surface on which the skate is used, and a projection extending from the rear of the skate, the L-shaped member being attached to the projection whereby it may act unitarily therewith and cause retardation of the skate primarily by the engagement of the base with the ground when the skate is tilted.

5. Braking means for a roller skate consisting of projections extending from the rear of the skate in the longitudinal plane of the skate, said projections having portions thereof extending transversely of the skate, friction brake members and means for attaching said brake members to said transverse portions of said projections, whereby the friction brake members are adapted to engage the ground by the tilting of said skate.

6. Braking means for a roller skate consisting of projections extending from the rear of the skate, and friction members substantially of L-formation secured to the terminals of said projections and adapted to engage the ground frictionally when the skate is tilted to stop the skate primarily by the engagement with the ground, said projections extending rearwardly and being elongated in form, the length thereof lying in the longitudinal plane of the skate.

7. As an article of manufacture, an independent friction member for a skate brake, said member being substantially of L-formation and having a portion thereof for attachment to the rear of the skate, and another portion adapted to extend substantially parallel to the ground and engage the ground when the skate is tilted, said friction member being of homogeneous formation, the ground engaging portion thereof having a curved front surface and the lower surface being of ample width to stop the skate primarily by the frictional engagement with the ground, and the friction member as a whole being adapted to be secured to a projection extending from the rear of the skate truck.

8. In a roller skate having a rear truck with a plurality of wheels, braking means consisting of friction members attachable to the rear truck of the skate and adapted to engage the ground by the tilting of the skate, said friction members being approximately of the width of the rear wheels of the skate, and being attachable behind the rear wheels for independent or simultaneous operation.

9. A brake for a skate having a truck with two wheels consisting of means adapted to be secured to a rear part of said truck, and friction members secured to said means and being adapted to engage the ground by the tilting of said skate, said friction members being spaced apart from each other and lying at opposite sides of the longitudinal central axis of the skate.

10. A brake for a skate, said brake consisting of a friction member adapted to engage the supporting surface on which the skate is used, means whereby the friction member may be adjusted relative to the supporting surface to compensate for the wear upon said friction member caused by engagement with said surface, and means whereby the portion of said member facing the normal line of travel of the skate presents a curved surface to the line of travel regardless of said adjustment.

11. A brake for a skate truck, said brake consisting of a friction member adapted to engage the supporting surface on which the skate is used, and controlling means on the truck whereby said friction member may be adjusted through an arc to present various portions thereof to the supporting surface.

LEON DEWAN.
JOHN BARTHO.